(12) United States Patent
Ries

(10) Patent No.: US 8,094,697 B2
(45) Date of Patent: Jan. 10, 2012

(54) METHOD AND DEVICE FOR THE DEMODULATION OF SATELLITE RADIO NAVIGATION SIGNALS

(75) Inventor: Lionel Ries, Toulouse (FR)

(73) Assignee: Centre National d'Etudes Spatiales, Paris (FR)

( * ) Notice: Subject to any disclaimer, the term of this patent is extended or adjusted under 35 U.S.C. 154(b) by 767 days.

(21) Appl. No.: 10/560,552

(22) PCT Filed: Jun. 3, 2004

(86) PCT No.: PCT/FR2004/001380

§ 371 (c)(1),
(2), (4) Date: Jan. 23, 2007

(87) PCT Pub. No.: WO2005/006012

PCT Pub. Date: Jan. 20, 2005

(65) Prior Publication Data

US 2008/0031281 A1 Feb. 7, 2008

(30) Foreign Application Priority Data

Jun. 13, 2003 (FR) ..................................... 03 07174

(51) Int. Cl.
*H04B 1/00* (2006.01)
(52) U.S. Cl. ........ 375/130; 375/326; 375/327; 375/340; 375/335; 701/216
(58) Field of Classification Search ................... 375/130
See application file for complete search history.

(56) References Cited

U.S. PATENT DOCUMENTS

| | | | |
|---|---|---|---|
| 3,568,066 A * | 3/1971 | Fujimura | 375/330 |
| 3,740,671 A * | 6/1973 | Crow et al. | 333/172 |
| 5,768,319 A | 6/1998 | Durboraw, III | |
| 5,943,248 A * | 8/1999 | Clapp | 708/270 |
| 6,226,317 B1 | 5/2001 | Bruckert et al. | |
| 6,353,408 B1 | 3/2002 | Whight | |
| 6,396,824 B1 * | 5/2002 | Schilling | 370/335 |
| 6,424,826 B1 | 7/2002 | Horton et al. | |
| 6,470,044 B1 * | 10/2002 | Kowalski | 375/148 |
| 6,538,599 B1 * | 3/2003 | David | 342/196 |

(Continued)

OTHER PUBLICATIONS

Hegarty, Christopher J.: "Evaluation of the Proposed Signal Structure for the New Civil GPS Signal at 1176.45 MHz", Mitre Corporation, WN 99W0000034, 'Online! Jun. 1999, pp. 1-28, XP002272159; McLean, Virginia, USA, Retrieved from the Internet: URL:http://www.mitrecaasd.org/library/papers/gps_15_signal.pdf> 'retrieved on Feb. 27, 2004.

(Continued)

*Primary Examiner* — Shuwang Liu
*Assistant Examiner* — Lihong Yu
(74) *Attorney, Agent, or Firm* — Harness, Dickey & Pierce, PLC

(57) ABSTRACT

For demodulating radio navigation signals (s(t)) transmitted in spread spectrum and comprising a data channel modulated by a navigation message and a pilot channel not modulated by a navigation message, the data channel and the pilot channel are combined into one multiplexing scheme so as to modulate a carrier, this method consists in applying de-spreading processing to the pilot and data channels' signals and in demodulating the de-spread data signal ($r_d$) in order to obtain the navigation message <d(t)>, the demodulation of the de-spread data signal ($r_d$) used to obtain the navigation message <d(t)> is performed using the carrier ($r_p$) obtained from the dispreading processing of the pilot channel.

10 Claims, 3 Drawing Sheets

U.S. PATENT DOCUMENTS

Figure 1:
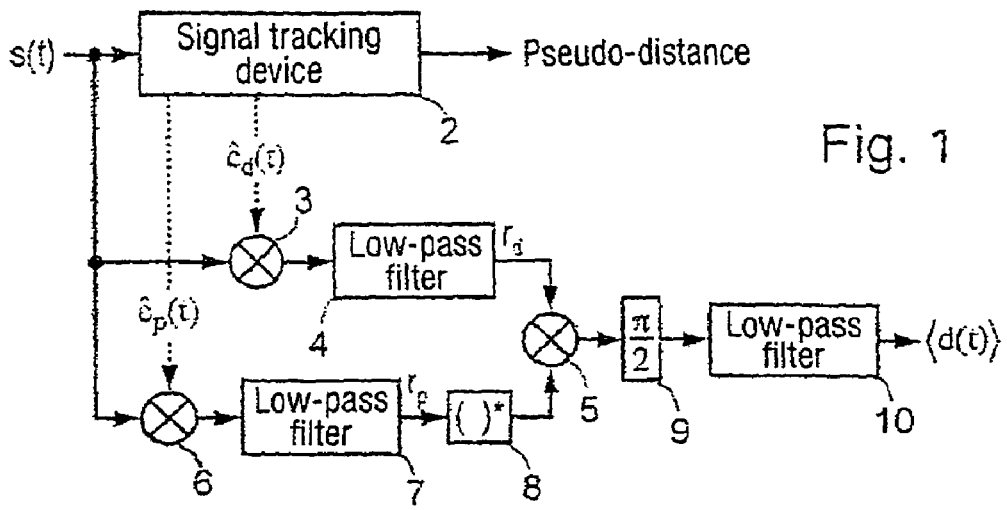

| | | | |
|---|---|---|---|
| 6,711,219 B2 * | 3/2004 | Thomas et al. | 375/346 |
| 7,183,971 B1 * | 2/2007 | Lloyd et al. | 342/357.09 |
| 2001/0020216 A1 * | 9/2001 | Lin | 701/216 |

OTHER PUBLICATIONS

Ries, L. et al.: "A Software Receiver for GPS-IIF L5 Signal", Institute of Navigation Ion GPS 2002 conference, 'Online! Sep. 24, 2002-Sep. 27, 2002, pp. 1540-1553, XP002272161; Portland, OR, USA, Retrieved from the Internet: URL:http://www.recherche.enac.fr/ltst/papers/ion_gps_02_L5.pdf> 'retrieved on Mar. 2, 2004.

Hein, G. W., et al: "Status of Galileo Frequency and Signal Design" Institute of Navigation Ion GPS 2002 conference, 'Online! Sep. 24, 2002 -Sep. 27, 2002 pp. 1-13, XP002272160; Portland, OR, USA; Retrieved from the Internet: URL:http://europa.eu.int/comm/dgs/energy_transport/galileo/doc/galileo_stf_ion2002.pdf> 'retrieved on Mar. 2, 2004.

* cited by examiner

METHOD AND DEVICE FOR THE DEMODULATION OF SATELLITE RADIO NAVIGATION SIGNALS

The present invention relates to a method for the demodulation of radio navigation signals, comprising a data channel which is modulated by a radio navigation message and a pilot channel which is not modulated, these signals being transmitted in spread spectrum using pseudo-random spectrum spreading codes.

It applies in particular, but not exclusively, to satellite radio navigation signals, and in particular to the new L2C and L5 signals of the GPS (Global Positioning System) satellite navigation system, to the signals of the new GALILEO European satellite navigation system, to the satellite navigation signals transmitted by ground stations known as "pseudolites", by modernized GLONASS satellites, and COMPASS and QZS satellites (Quasi-Zenith Satellite system).

In a satellite navigation system, a radio navigation signal receiver comprises a number of receiving channels for receiving radio navigation signals from a number of satellites (at least three) simultaneously. Each receiving channel carries out a measurement of the spreading code and a measurement of the frequency of the received carrier. These measurements make it possible to determine the distance and the radial velocity between the receiver and the satellite and to retrieve the radio navigation message which contains in particular information relating to the transmitting satellite, namely its trajectory, its status and corrective terms to be applied to its clock, and also global information relating to the trajectories of all the satellites of the navigation system.

Usually, the demodulation of a radio navigation signal in spread spectrum is carried out by means of two operations, namely an operation of despreading the signal by means of a reference code and an operation of estimating the phase of the signal to remove the ambiguity of the signal, that is to say estimating the sign of the symbol of the message. The first operation is carried out by means of a delay-lock loop (DLL), which may or may not be coherent, and the second operation is usually carried out by means of a phase-lock loop (PLL) or a Costas loop, which makes it possible to reconstruct a replica of the carrier which is multiplied by the received signal. The resulting signal is filtered so as to extract therefrom the information modulating the carrier.

This means that the demodulation can be carried out only when these two loops are latched. Since the delay-lock loop is usually more robust than the phase-lock loop, the demodulation can be carried out only when the signal-to-noise spectral density ratio of the received signal exceeds the latch threshold of the phase-lock loop or Costas loop. This latch threshold is situated below the readability threshold of the navigation message for the purpose of position calculation. This is because it is considered that, above a bit error rate BER of $10^{-4}$ to $10^{-5}$, the message can no longer be used for position calculation.

This technique thus exhibits the drawback of no longer being able to demodulate the message once the phase-lock loop is un latched.

However, up to a BER value of approximately $10^{-1}$, the navigation message can be used for tracking, using techniques known as "data-wiping". These techniques use the removal of the ambiguity on the sign of the symbol to track the pre-detection of the signal in bands well below that of the navigation message. However, these techniques can be applied only if estimation of the symbol is possible, that is to say for as long as the carrier loop remains latched.

Thus, some receivers comprise a device which makes it possible for them to track the code of the signal (data signal or pilot signal) even when the carrier detection loops are no longer operating. This mode of operation, which is commonly referred to as the "code only" mode, makes it possible to track the signal in cases where the link budget is relatively unfavorable, but does not make it possible to demodulate the navigation message.

The object of the present invention is to eliminate these drawbacks. This object is achieved by providing a method for the demodulation of radio navigation signals transmitted in spread spectrum and comprising a data channel which is modulated by a navigation message and a pilot channel which is not modulated by a navigation message, the data channel and the pilot channel being combined into one multiplexing scheme in order to modulate a carrier, this method consisting in subjecting the signals of the pilot and data channels to despreading processing and in demodulating the despread data signal in order to obtain the navigation message.

According to the invention, the demodulation of the despread data signal used to obtain the navigation message is performed with the aid of the carrier obtained from the despreading processing of the pilot channel.

By virtue of these provisions, it is not necessary to reconstruct the phase of the carrier. It is therefore no longer absolutely necessary to use a phase-lock loop. This means that:
- the demodulation can be carried out in "code only" mode, for example when the phase of the carrier is estimated by an external navigation system (for example an inertial system) or an internal navigation system (for example a Kalman filter using measurements carried out on the spreading code);
- the receiver can comprise only an FLL loop for tracking the carrier, thus simplifying the architecture of the receiver while offering greater robustness than a PLL loop;
- it is possible to estimate the symbol of the received message for "data-wiping" purposes, even when the signal-to-noise spectral density ratios are below the unlatch thresholds of a PLL loop;
- on the data channel, the removal of the ambiguity on the symbol of the message allows the use of an FLL loop discriminator based on the extended arctangent function.

In general, by virtue of the present invention, the demodulation of the navigation message is no longer dependent on the tracking threshold of a phase-lock loop (PLL). The data latch threshold depends on the tracking threshold of the delay-lock loop or on the conditions of use of a technique for removing the ambiguity of the symbol (bit error rate less than or equal to 10%).

According to one feature of the invention, the pilot channel and the data channel of the signal to be demodulated are time-multiplexed.

Alternatively, the pilot channel and the data channel of the signal to be demodulated are phase-multiplexed.

According to another alternative, the pilot channel and the data channel of the signal to be demodulated are multiplexed in accordance with an ALTBOC scheme.

According to one feature of the invention, the pilot channel and the data channel of the signal to be demodulated are multiplexed in accordance with a scheme in which the carrier contains at least the data channel and the pilot channel of the signal to be demodulated.

According to another feature of the invention, the despreading processing is performed by code tracking or estimation processing, combined with carrier phase or frequency tracking or estimation processing.

Preferably, the carrier tracking processing is performed with the aid of a frequency-lock loop and the code tracking processing is performed with the aid of a delay-lock loop.

According to one feature of the invention, this method is applied to the demodulation of satellite navigation signals of the GPS-IEF L5, L2C type, or to the demodulation of satellite navigation signals transmitted by the GALILEO system, or transmitted by ground stations, by modernized GLONASS satellites or by COMPASS or QZS satellites.

The invention also relates to a receiver for radio navigation signals transmitted in spread spectrum and comprising a data channel which is modulated by a navigation message and a pilot channel which is not modulated by a navigation message, the receiver comprising a despreading and tracking device comprising a spreading code generator which supplies spreading codes and means for applying the spreading codes to the signals of the pilot channel and data channel in order to obtain despread pilot and data signals.

According to the invention, this receiver comprises a demodulator which uses the despread pilot signal to demodulate the despread data signal in order to obtain the navigation message.

According to one feature of the invention, this receiver comprises means for estimating or tracking the frequency or phase of the despread pilot channel signal.

According to another feature of the invention, this receiver comprises a frequency-lock loop for tracking the pilot signal and a delay-lock loop which drives the spreading code generator.

Advantageously, the frequency-lock loop comprises a discriminator of extended arctangent form.

According to another feature of the invention, the frequency-lock loop comprises a first-order or second-order loop filter which is adapted to the dynamics of the received signals.

According to yet another feature of the invention, the output of the filter of the frequency-lock loop is coupled to the delay-lock loop, the delay-lock loop comprising a zero-order loop filter.

According to yet another feature of the invention, the delay-lock loop comprises a discriminator which is applied to the pilot signals and to the data signals, the data signals being weighted by a coefficient which depends on the signal-to-noise spectral density ratio of the received signals.

According to yet another feature of the invention, the frequency-lock loop is designed to receive Doppler velocity aid from a navigation system.

Figure 2:
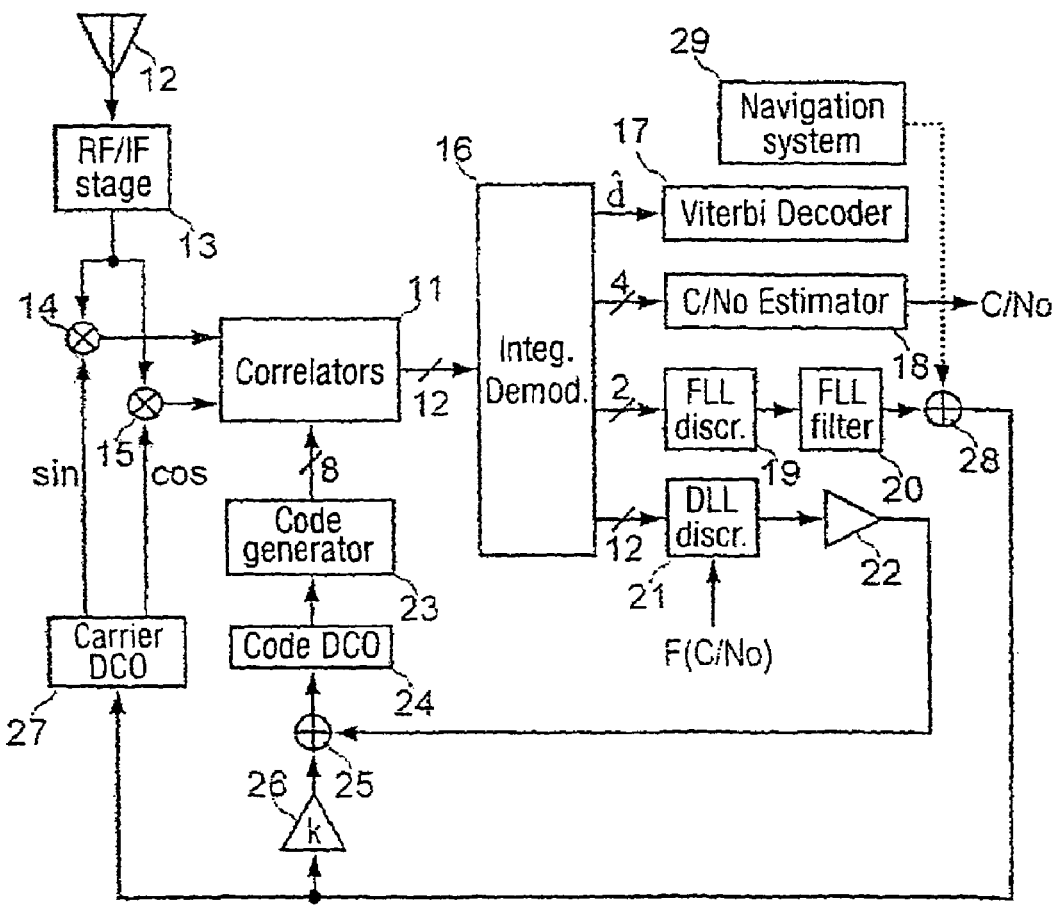
Figure 3:
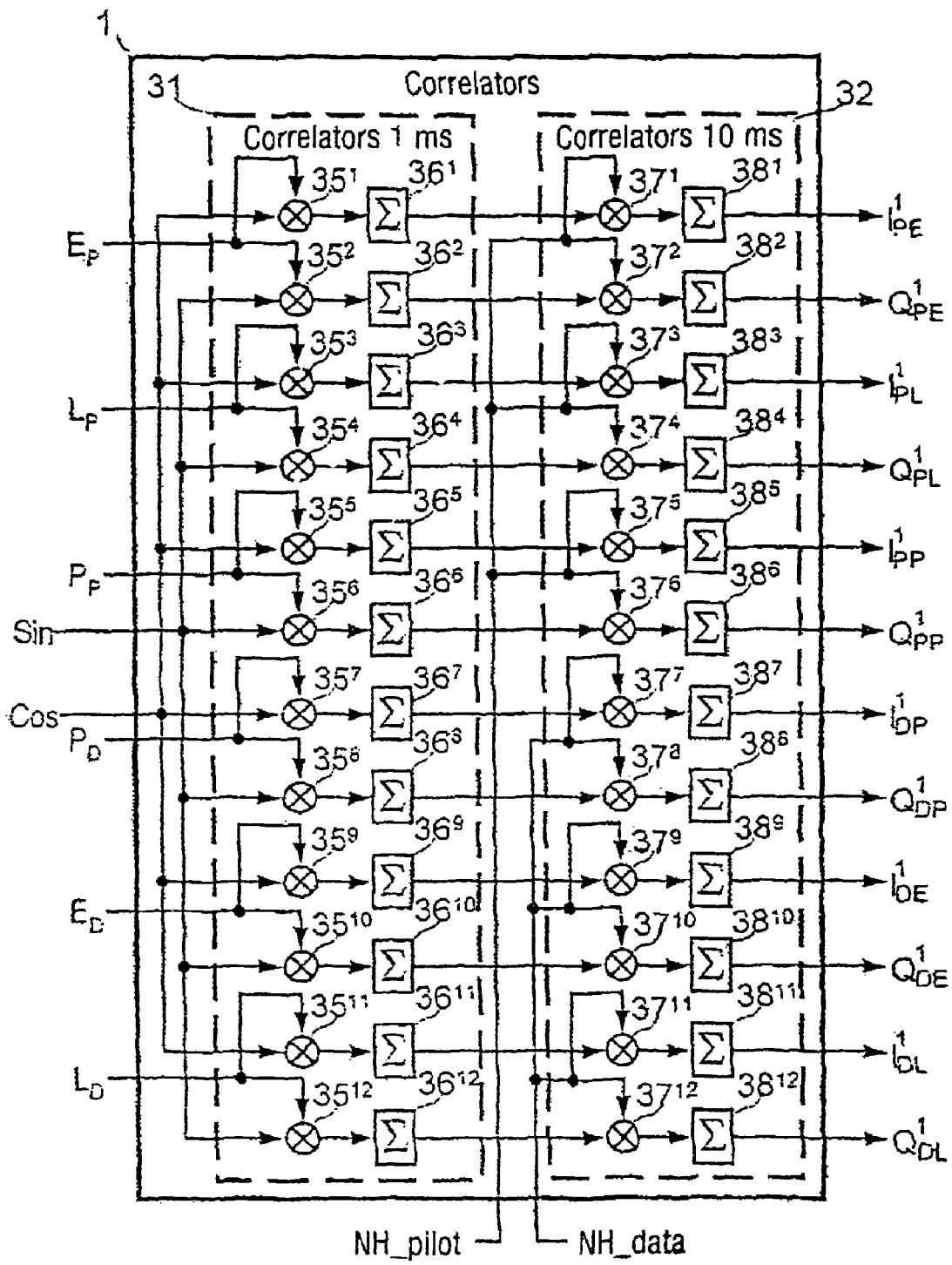
Figure 4:
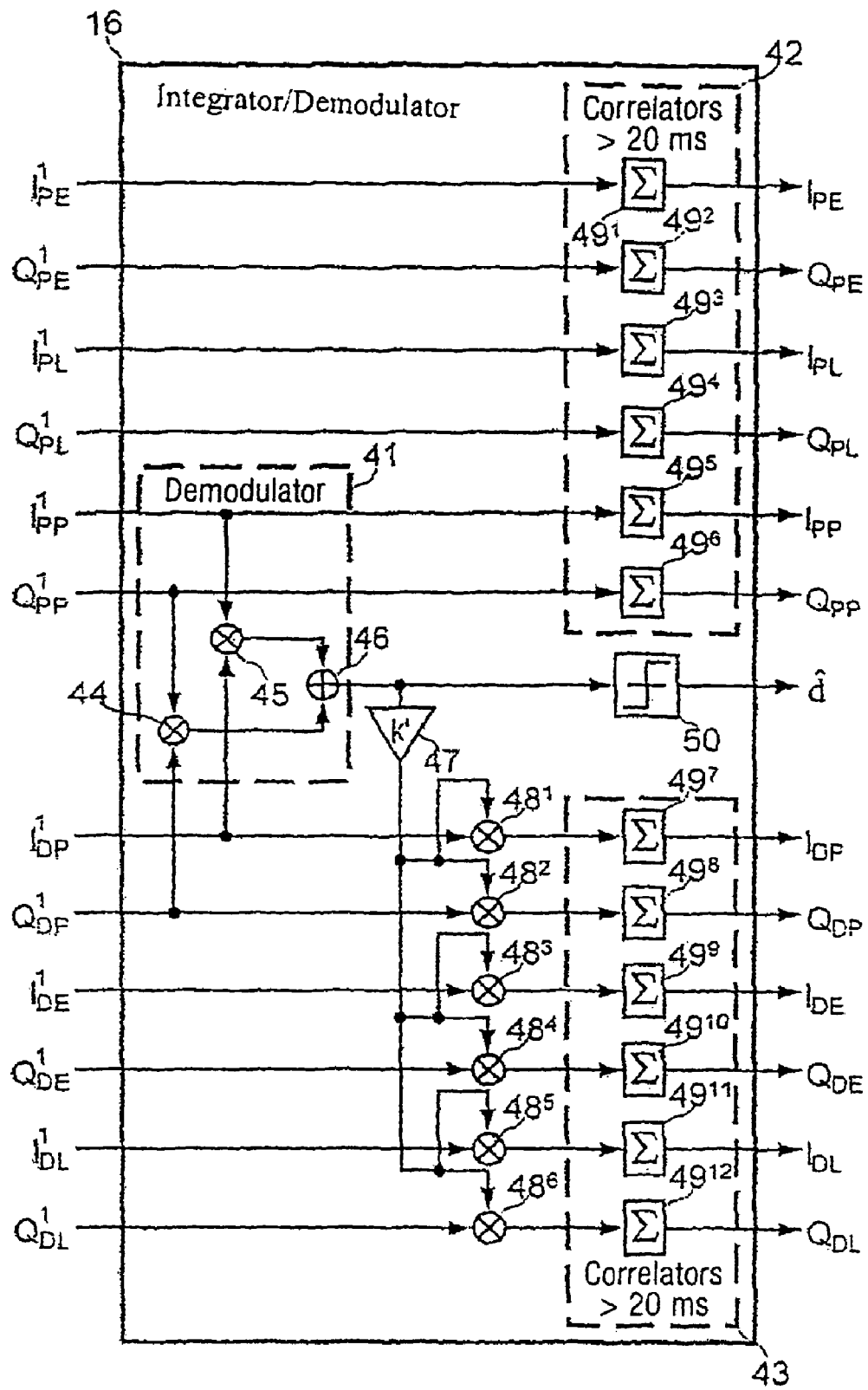

One preferred embodiment of the invention will be described below, by way of non-limiting example, with reference to the appended drawings, in which:

FIG. 1 schematically shows the general principle of the invention, in the form of a block diagram;

FIG. 2 schematically shows a receiver adapted to receive GPSIIF signals on band L5, applying the general principle of the invention;

FIGS. 3 and 4 show in greater detail some components of the receiver shown in FIG. 2.

Let s(t) be a radio navigation signal transmitted in spread spectrum, composed of the sum of a pilot signal $s_p(t)$ consisting of a non-modulated carrier signal, and of a data signal $s_d(t)$ consisting of a navigation message which modulates the carrier. In general, the complex envelope of such a signal s(t) can be written as follows:

$$s(t) = (s_d(t) + s_p(t))e^{j\Theta(t)} \quad (1)$$

in which:

$$s_p(t) = c_p(t) \times mux\_p(t) \quad (2)$$

$$s_d(t) = d(t) \times c_d(t) \times mux\_d(t) \quad (3)$$

$c_p$ and $c_d$ are the spreading codes which are respectively applied to the pilot channel and the data channel, d is the symbol of the navigation message, and mux_p and mux_d are the multiplexing functions of the pilot channel and data channel.

The multiplexing of the pilot and data channels can be carried out in terms of phase or time, or else in accordance with the ALTBOC or alternative BOC (Binary Offset Carrier) scheme, or in accordance with a scheme in which the carrier contains at least the data and pilot channels.

In the case of phase multiplexing, the data channel is for example in phase and the pilot channel is in quadrature. The functions mux_d(t) and mux_p(t) are then respectively equal to 1 and j (in complex notation). In the case of time multiplexing with a duty factor of 1, obtained by means of a clock which supplies a square signal $h_c(t)$ of value 0 and 1, mux_d(t) and mux_p(t) are respectively equal to $h_c(t)$ and $1-h_c(t)$.

Several architectures can be envisaged in respect of the circuit for tracking such a signal s(t). It is possible to envisage tracking only the pilot signal $s_p(t)$ or data signal $s_d(t)$ or both these signals simultaneously. In any case, it is necessary to despread the received pilot and data signals, by means of codes in phase, using any suitable despreading device, for example comprising a delay-lock loop (DLL) and correlators.

Following despreading of the code over one symbol period of the message, the signals at the output of the correlators in phase can be written as follows:

$$r_d(\tau) = R_d(\tau) \times \langle d(t)e^{j(\theta(t)-\hat{\theta}_d(t))} \rangle \quad (4)$$

$$r_p(\tau) = R_p(\tau) \times \langle e^{j(\theta(t)-\hat{\theta}_p(t))} \rangle \quad (5)$$

in which:

$R_p(\tau)$ and $R_d(\tau)$ are the code autocorrelation functions for a phase shift of $\tau$, $\theta(t)$ is the phase of the received composite signal s(t), and $\hat{\theta}_d(t)$ and $\hat{\theta}_p(t)$ are the phase estimates respectively of the data and pilot signals supplied by a carrier frequency estimation device.

For carrier estimation, use may be made of an FLL loop (frequency-lock loop) or an external navigation device.

Once the value $$e^{j(\hat{\theta}_p(t)-\hat{\theta}_d(t))}$$

is known with sufficient accuracy, which is the case for phase-multiplexed or time-multiplexed signals for example, it is possible to estimate the value of the symbol of the message by calculating the following expression which results from equations (4) and (5):

$$r_d(\tau) \times r_p(\tau)^* \times e^{j(\hat{\theta}_p(t)-\hat{\theta}_d(t))} = R_d(\tau)R_p^*(\tau) \times \langle d(t) \rangle \quad (6)$$

in which the sign * represents the complex conjugation operation.

This expression delivers an estimate of the symbol d while the delay-lock loop remains latched (the autocorrelation functions $R_p$ and $R_d$ then have a value close to 1).

In the case where the data and pilot signals are phase-multiplexed, the signal s(t) is then a signal which is modulated according to the QPSK (Quaternary Phase-Shift Keying) technique, the channel in phase being modulated by the data signal and the channel in quadrature being modulated by the pilot signal. Based on equations (2) and (3), such a signal can be written as follows:

$$s(t) = \sqrt{2a_d P} \times d(t) \times c_d(t) \cos \phi(t) - \sqrt{2a_p P} \times c_p(t) \sin \phi(t) \quad (7)$$

or, in complex notation:

$$s(t) = R[\sqrt{2a_d P} \times d(t) \times c_d(t) + j\sqrt{2a_p P} \times c_p(t) e^{j\phi(t)}] \quad (8)$$

in which $a_p$ and $a_d$ respectively represent the relative powers of the pilot channel and data channel, d is the symbol of the navigation message and P represents the total power of the signal s(t).

FIG. 1 shows a device for receiving such navigation signals which uses this principle. This device comprises a signal tracking device 2 which uses techniques suitable for processing such signals, namely for example a delay-lock loop DLL and a frequency-lock loop FLL according to the invention. This device supplies an estimate of the despreading codes $\hat{c}_d$ and $\hat{c}_p$, and also an estimate of a pseudo-distance between the receiver and the transmitter of the radio navigation signal, based on a difference between the clocks of the transmitter and the receiver. The code estimates are applied to the input of mixers 3 and 6 for respectively despreading the components $s_d(t)$ and $s_p(t)$ of the received composite signal s(t). The signals at the output of the mixers 3 and 6 are respectively applied to two low-pass filters 4 and 7 (which may be formed by summers) so as to obtain the following signals $r_d$ and $r_p$, which correspond to the despread components $s_d(t)$ and $s_p(t)$:

$$r_d = \langle d(t) \rangle R_d(\tau) e^{j\varphi} \quad (9)$$

$$r_p = R_p(\tau) e^{j\left(\varphi \frac{\pi}{2}\right)} \quad (10)$$

in which $\tau$ is the phase shift between the received signal s(t) and the local replicas, R is the correlation function of the pilot and data codes and $\langle d(t) \rangle$ is the estimate of the symbol of the navigation message. The latter is extracted by applying a complex conjugation operation 8 to the pilot signal $r_p$, then by multiplying the result of this operation by the data signal $r_d$, by means of a mixer 5. The product $r_d \times r_p^*$, phase-corrected by a rotation of $$\frac{\pi}{2}$$

by means of a phase shifter 9, and optionally filtered by means of a low-pass filter 10, supplies an estimate $\langle d(t) \rangle$ of the symbol of the navigation message.

It should be noted that the GPS-IIF signal on band L5, according to the latest specification currently in force, is one specific case of the signal s(t) described above, with $a_d = a_p$.

Moreover, the GPS-IIF signal on band L2, referred to as L2C, is an example of a signal in which the signals $s_d(t)$ and $s_p(t)$ are time-multiplexed.

FIG. 2 shows in greater detail one example of a receiver for receiving GPS-IIF signals on band L5, which uses the principle of the invention as described above.

This receiver comprises a receiving antenna 12 which is connected to a stage 13 for converting the frequency RF of the received signals into an intermediate frequency IF. The output of this stage is connected to a stage for removing the carrier, comprising for example two mixers 14, 15 which respectively receive on another input the imaginary and real parts of the carrier generated locally by the receiver. The received signal from which the locally estimated frequency of the carrier has been removed is applied to a set of correlators 11, said set of correlators receiving on another input estimated values of six spreading codes and of two Neuman-Hoffman codes, produced by a code generator 23.

The set of correlators 11 delivers, on separate outputs, twelve signals comprising the real I and imaginary Q parts of three output signals, respectively in phase, advanced and delayed, for each of the pilot and data signals contained in the received signal.

These twelve signals are processed by an integrator/demodulator assembly 16 which restores them at the output after processing and supplies an estimate $\hat{d}$ of the received message symbol.

The estimate $\hat{d}$ of the received message symbol which is supplied by the assembly 16 is applied to a convolutional decoder 17, for example of the Viterbi decoder type. This convolutional decoder can use the a priori knowledge of the navigation message to improve the decoding.

The in-phase signals of the pilot channel which are output from the assembly 16 are applied to an FLL (frequency-lock loop) discriminator 19, while all of the twelve signals output from the assembly 16 are applied to a DLL (delay-lock loop) discriminator 21.

The in-phase signals output from the assembly 16 can also be applied to a noise estimator 18 which supplies an estimate of the received signal-to-noise spectral density ratio $C/N_0$, this ratio transformed by a function F being applied to the input of the DLL loop discriminator 21.

The output signal from the FLL loop discriminator is processed by an FLL loop filter 20 before being applied to the control input of a digitally controlled oscillator (DCO) 27 which generates locally an estimate of the carrier of the received signal, when the FLL loop thus formed is locked to the carrier of the received signal. The oscillator 27 delivers, on separate outputs, the imaginary part (sin) and the real part (cos) of the carrier, which are respectively applied to the input of the mixers 14, 15.

The output signal from the DLL loop discriminator is also processed by a DLL loop filter 22. Moreover, the output of the FLL filter 20 is also connected, via an amplifier 26 of gain k, to the input of a summer 25 which also receives at the input the output signal from the DLL loop filter 22.

The value of the gain k is selected to be equal to the ratio $R_c/R_p$ which represents the proportionality coefficient between the frequency of the code $R_c$ and the frequency of the carrier $R_p$. In the case of GPS-IIF signals on band L5, this ratio is 1/115. The output of the summer 25 is connected to the control input of another digitally controlled oscillator (DCO) 24, the output signal of which drives the code generator 23.

Given that the DLL loop is assisted by the FLL loop (by virtue of the factor k), most of the dynamics of the signal are absorbed by the FLL carrier loop. The DLL loop therefore sees only very weak dynamics (for example due to the effects of the ionosphere). The DLL loop filter 22 can thus be of zero order, that is to say it can be formed by a simple amplifier having a certain gain. By contrast, the FLL loop filter 20 is of higher order, typically first or second order, which can be adapted to the dynamics of the signal to be processed. The gain of the DLL loop filter 22 can be adjusted so as to be adapted to the characteristics of the signal to be processed (signal-to-noise ratio, residual dynamics, effect of the local oscillator 27, etc.).

In order to reduce the acquisition and tracking threshold of the receiver, it is also possible to use an internal or external navigation system 29 which supplies an estimate of the Doppler velocity, that is to say the relative radial velocity of the receiver with respect to the transmitter of the radio navigation signals. This estimate of the Doppler velocity is applied to the input of a summer 28 interposed on the link between the output of the FLL filter 20 and the input of the oscillator 27.

More specifically, the spreading codes and Neuman-Hoffman codes estimated by the code generator 24 as a function of the frequency of the signal output from the oscillator 24 comprise, by way of example:
- a code $E_P$ generated for the advanced pilot channel,
- a code $L_P$ generated for the delayed pilot channel,
- a code $P_P$ generated for the in-phase pilot channel,
- a code $E_D$ generated for the advanced data channel,
- a code $L_D$ generated for the delayed data channel,
- a code $P_D$ generated for the in-phase data channel,
- a 20-bit Neuman-Hoffman code NH_pilot for the pilot channel, and
- a 10-bit Neuman-Hoffman code NH_data for the data channel.

In FIG. 3, the set of correlators 11 comprises a block 31 of 1 kHz correlators which perform coherent integration within 1 ms and to which there are applied the signals output from the mixers 14, 15, and a block 32 of 100 Hz correlators which perform coherent integration within 10 ms and to which there are respectively applied the output signals from the block 31.

The block 31 also receives the spreading codes generated for the pilot channel $E_P$, $L_P$, $P_P$ and for the data channel $E_D$, $L_D$, $P_D$, while the block 32 receives the Neuman-Hoffman codes NH_pilot and NH_data that are generated respectively for the pilot channel and the data channel.

Each of the blocks 31, 32 of correlators comprises twelve channels, each comprising a respective input of the block which is connected to the input of a mixer, $35^1$ to $35^{12}$ and $37^1$ to $37^{12}$, respectively, and a summer, $36^1$ to $36^{12}$ and $38^1$ to $38^{12}$, respectively, the input of which is connected to the output of the mixer of the channel and the output of which forms a respective output of the block. The other input of the mixers $35^1$ to $35^{12}$ and $38^1$ to $38^{12}$ receives a respective spreading code or Neuman-Hoffman code.

In the first block 31 of 1 kHz correlators, the mixers $35^1$ to $35^{12}$ are grouped together in pairs, each receiving the same spreading code and, respectively, the real signal and the imaginary signal output respectively from the mixers 14, 15.

Thus, in the first block 31 of correlators, the pair of mixers $35^1$ and $35^2$ receives the spreading code $E_P$, the pair of mixers $35^3$ and $35^4$ receives the spreading code $L_P$, and the pair of mixers $35^5$ and $35^6$ receives the spreading code $P_P$, the pair of mixers $35^7$ and $35^8$ receives the spreading code $P_D$, the pair of mixers $35^9$ and $35^{10}$ receives the spreading code $E_D$, and the pair of mixers $35^{11}$ and $35^{12}$ receives the spreading code $L_D$.

The first six mixers $37^1$ to $37^6$ of the second block 32 receive at the input the Neuman-Hoffman code NH_pilot of the pilot channel, while the other six mixers $37^7$ to $37^{12}$ of the second block 32 receive at the input the Neuman-Hoffman code NH_data of the data channel.

The outputs of the second block 32 supply the signals denoted respectively $I_{PE}^1$, $Q_{PE}^1$, $I_{PL}^1$, $Q_{PL}^1$, $I_{PP}^1$, $Q_{PP}^1$, $I_{DP}^1$, $Q_{DP}^1$, $I_{DE}^1$, $Q_{DE}^1$, $I_{DL}^1$, $Q_{DL}^1$, which are applied to the respective inputs of the integrator/demodulator assembly 16 which is shown in more detail in FIG. 4.

In said figure, the assembly 16 comprises one demodulator block 41 and two integrator blocks 42, 43, each comprising six summers $49^1$ to $49^6$ and $49^7$ to $49^{12}$ respectively, respectively receiving the signals output from the set 11, said integrator blocks tracking for up to 20 ms or more the coherent integration performed by the set of correlators 11.

Thus, the signals $I_{PE}^1$, $Q_{PE}^1$, $I_{PL}^1$, $Q_{PL}^1$, $I_{PP}^1$ and $Q_{PP}^1$ output from the set 11 are applied to the block 42 of summers $49^1$ to $49^6$ comprising one summer for each input signal of the block, these summers respectively delivering the signals $I_{PE}$, $Q_{PE}$, $I_{PL}$, $Q_{PL}$, $I_{PP}$ and $Q_{PP}$ relating to the pilot channel. The signals $I_{DP}^1$, $Q_{DP}^1$, $I_{DE}^1$, $Q_{DE}^1$, $I_{DL}^1$, $Q_{DL}^1$ output from the set 11 are respectively applied, via respective mixers $48^1$ to $48^6$, to the summers $49^7$ to $49^{12}$ of the block 43, which respectively deliver the signals $I_{DP}$, $Q_D$, $I_{DE}$, $Q_{DE}$, $I_{DL}$ and $Q_{DL}$ relating to the data channel.

In the demodulator block 41, the signals $I_{PP}^1$ and $I_{DP}^1$ are applied to one mixer 45, while the signals $Q_{PP}^1$ and $Q_{DP}^1$ are applied to another mixer 44. The outputs of the two mixers 44, 45 are added together in a summer 46, which thus delivers an estimate $\hat{d}$ of the symbol d of the received message. We therefore have:

$$\hat{d} = I_{PP}^1 \times I_{DP}^1 + Q_{PP}^1 \times Q_{DP}^1 \qquad (11)$$

The other input of the mixers $48^1$ to $48^6$ receives the estimate $\hat{d}$ of the symbol d of the received message, processed by an amplifier 47 of gain k' which may for example be selected as a function of the estimate of the signal-to-noise ratio of the received signal, k' being smaller the lower the signal-to-noise ratio. The proportionality factor k' thus applied to the estimate $\hat{d}$ of the received symbol makes it possible to weight the data channel with respect to the pilot channel so as to optimize the desired performance of the receiver.

Provision may be made to process the estimate signal $\hat{d}$ of the symbol d of the received message by means of a threshold comparator 50 which makes it possible to discriminate the sign of the received message symbols, it being possible for this threshold comparator to be arranged upstream or downstream of the amplifier 47.

The signals output from the assembly 16 represent:
$I_{PE}$—the real part of the phase-advanced pilot signal,
$Q_{PE}$—the imaginary part of the phase-advanced pilot signal,
$I_{PL}$—the real part of the phase-delayed pilot signal,
$Q_{PL}$—the imaginary part of the phase-delayed pilot signal,
$I_{PP}$—the real part of the in-phase pilot signal,
$Q_{PP}$—the imaginary part of the in-phase pilot signal,
$I_{DP}$—the real part of the in-phase data signal,
$Q_{DP}$—the imaginary part of the in-phase data signal,
$I_{DE}$—the real part of the phase-advanced data signal,
$Q_{DE}$—the imaginary part of the phase-advanced data signal,
$I_{DL}$—the real part of the phase-delayed data signal, and
$Q_{DL}$—the imaginary part of the phase-delayed data signal.

According to the invention, the tracking device of the receiver which has just been described uses only the pilot channel. The discriminator 19 of the FLL carrier loop can be represented by the following expression:

$$\text{ATAN2}\left(\frac{I_{PP}(n)Q_{PP}(n-1) - I_{PP}(n-1)Q_{PP}(n)}{I_{PP}(n)I_{PP}(n-1) + Q_{PP}(n)Q_{PP}(n-1)}\right) \qquad (12)$$

in which:
ATAN2( ) represents the extended arctangent function, supplying a result within the range ]−π, +π[,
X(n−1) and X(n) represent the values of the signal X at two successive instants n−1 and n, that is to say two successive signal samples at the output of the blocks of correlators 42, 43. These two successive signal samples are thus spaced apart by the duration of the integration (20 ms or more) performed by the correlators of the blocks 42, 43.

By contrast, the discriminator 21 of the delay-lock loop DLL uses both the data channel and the pilot channel. It can be represented by the following expression:

$$D_P + F(C/N_0) \cdot D_D \qquad (13)$$

in which:

$$D_P = (2 - Cs) \cdot \frac{(I_{PE} - I_{PL}) \cdot I_{PP} + (Q_{PE} - Q_{PL}) \cdot Q_{PP}}{(I_{PE} + I_{PL}) \cdot I_{PP} + (Q_{PE} + Q_{PL}) \cdot Q_{PP}} \qquad (14)$$

and $$D_D = (2 - Cs) \cdot \frac{(I_{DE} - I_{DL}) \cdot I_{DP} + (Q_{DE} - Q_{DL}) \cdot Q_{DP}}{(I_{DE} + I_{DL}) \cdot I_{DP} + (Q_{DE} + Q_{DL}) \cdot Q_{DP}} \qquad (15)$$

and Cs represents the phase shift expressed in terms of the number of chips between the advanced and delayed phases (phase shift between the signals of index E and the signals of index L, for example $I_{PE}$ and $I_{PL}$). Cs is typically expressed in terms of the inverse power of 2 and is for example $2^{-1}$ or $2^{-2}$.

In formula (13), the discriminator $D_D$ applied to the data channel is thus weighted by a coefficient $F(C/N_0)$ which depends on the ratio $C/N_0$ determined by the function 18. Thus, when the signal-to-noise spectral density ratio $C/N_0$ is large, this weighting coefficient is close to 1, and when this ratio decreases the coefficient $F(C/N_0)$ tends toward 0.

In the receiver which has just been described, the carrier frequency and the codes are obtained by means of closed-loop tracking devices (FLL loops and DLL loop). As an alternative, open-loop devices may be provided in which the error signals output from the discriminators 19 and 21 are used only periodically (and not continuously as in the case of closed-loop tracking devices) by devices for estimating the carrier and codes phase or frequency.

The invention claimed is:

1. A method for demodulation of radio navigation signals that are transmitted in spread spectrum and that comprise (i) a data channel that is modulated by a navigation message and (ii) a pilot channel that is not modulated by the navigation message, the data channel and the pilot channel being combined into one multiplexing scheme in order to modulate a carrier, the method comprising:
    determining Doppler velocity aid using a discrete navigation system that does not rely only on the radio navigation signals, wherein the discrete navigation system combines information from the radio navigation signals with other information that is independent of the radio navigation signals;
    generating a despread data signal by subjecting the signals of the pilot and data channels to despreading processing; and
    demodulating the despread data signal in order to obtain the navigation message,
    wherein the demodulation of the despread data signal used to obtain the navigation message is performed with the aid of the carrier obtained from the despreading processing of the pilot channel,
    wherein the despreading processing is performed by code tracking processing combined with at least one of carrier phase tracking processing or carrier frequency tracking processing,
    wherein the code tracking processing is performed using a delay-lock loop (DLL) or an open-loop device of zero order, and
    wherein the carrier tracking processing is performed using an open-loop filter of first or second order.

2. The method as claimed in claim 1, wherein the pilot channel and the data channel are time-multiplexed.

3. The method as claimed in claim 1, wherein the pilot channel and the data channel are phase-multiplexed.

4. The method as claimed in claim 1, wherein the pilot channel and the data channel are multiplexed in accordance with a scheme in which the carrier includes at least the data channel and the pilot channel.

5. The method as claimed in claim 1, wherein the method is applied to at least one of (i) demodulation of satellite navigation signals of GPS-IIF L5, L2C type, or (ii) demodulation of satellite navigation signals transmitted by one of a GALILEO system, ground stations, modernized GLONASS satellites, COMPASS satellites, or QZS satellites.

6. A receiver for radio navigation signals that are transmitted in spread spectrum and that comprise (i) a data channel that is modulated by a navigation message and (ii) a pilot channel that is not modulated by the navigation message, the data channel and the pilot channel being combined into one multiplexing scheme in order to modulate a carrier, the receiver comprising:
    a discrete navigation system that determines a Doppler velocity aid, wherein the discrete navigation system does not rely only on the radio navigation signals, and wherein the discrete navigation system combines information from the radio navigation signals with other information that is independent of the radio navigation signals;
    a despreading and tracking device comprising (i) a spreading code generator that supplies spreading codes and (ii) first means for applying the spreading codes to the pilot channel and the data channel in order to obtain despread pilot and data signals;
    a demodulator that, with the aid of the carrier obtained from the despreading processing of the pilot channel, uses the despread pilot signal to demodulate the despread data signal in order to obtain the navigation message;
    wherein the despreading processing is performed by code tracking processing combined with at least one of carrier phase tracking processing or carrier frequency tracking processing;
    second means for performing code tracking and one of estimating or tracking frequency or phase of the despread pilot signal, wherein the second means is designed to receive the Doppler velocity aid from the discrete navigation system;
    wherein the code tracking processing is performed using a delay-lock loop (DLL) or an open-loop device of zero order, and
    wherein the carrier tracking processing is performed with the aid of a frequency-lock loop (FLL) using an open-loop filter of first or second order.

7. The receiver as claimed in claim 6, wherein the FLL comprises a discriminator of extended arctangent form.

8. The receiver as claimed in claim 6, wherein the FLL comprises one of a first-order filter and a second-order loop filter, wherein the filter is adapted to dynamics of the radio navigation signals.

9. The receiver as claimed in claim 8, wherein an output of the filter is coupled to the DLL, the DLL comprising a zero-order loop filter.

10. The receiver as claimed in claim 6, wherein the DLL comprises a discriminator that is applied to the despread pilot and data signals, the despread data signal being weighted by a coefficient that depends on a signal-to-noise spectral density ratio $(C/N_0)$ of the radio navigation signals.

* * * * *